US008328515B2

(12) United States Patent
Dawoud et al.

(10) Patent No.: US 8,328,515 B2
(45) Date of Patent: Dec. 11, 2012

(54) WIND POWER DEVICE

(76) Inventors: Guirguis Saad Dawoud, W. Covina, CA (US); Annetta Atia Yacoub, W. Covina, CA (US)

( * ) Notice: Subject to any disclaimer, the term of this patent is extended or adjusted under 35 U.S.C. 154(b) by 683 days.

(21) Appl. No.: 12/471,603

(22) Filed: May 26, 2009

(65) Prior Publication Data
US 2010/0303623 A1    Dec. 2, 2010

(51) Int. Cl.
*F03D 7/04*    (2006.01)
*F03D 9/00*    (2006.01)
(52) U.S. Cl. ........... 416/44; 416/10; 416/41; 416/132 B; 416/139; 416/142; 416/189; 416/196 A; 290/55
(58) Field of Classification Search ............. 416/10, 416/41, 44, 132 B, 139, 142, 189, 196 A; 290/55
See application file for complete search history.

(56) References Cited

U.S. PATENT DOCUMENTS

| 4,319,865 | A | * | 3/1982 | Richard | 416/41 |
| 4,729,716 | A | * | 3/1988 | Schmidt | 416/10 |
| 6,064,123 | A | * | 5/2000 | Gislason | 290/55 |
| 8,053,919 | B1 | * | 11/2011 | Sheth et al. | 290/55 |
| 2006/0275121 | A1 | * | 12/2006 | Merswolke et al. | 416/132 B |
| 2007/0166159 | A1 | * | 7/2007 | Williams | 416/10 |
| 2010/0264661 | A1 | * | 10/2010 | Barber | 290/55 |
| 2010/0264663 | A1 | * | 10/2010 | Barber | 290/55 |

* cited by examiner

*Primary Examiner* — Matthew W Such
*Assistant Examiner* — David Spalla
(74) *Attorney, Agent, or Firm* — Larisa Migachyov

(57) ABSTRACT

An improved wind-powered generator, comprising a wind wheel with semi-flexible sails, a supporting tower that can rotate freely with the wind direction, a fairing that ensures the wind wheel is always downwind of the tower, energy generators affixed to the upper tower and mechanically coupled to the rim of the wind wheel, and a controller that changes the angle of attack of the wings.

10 Claims, 6 Drawing Sheets

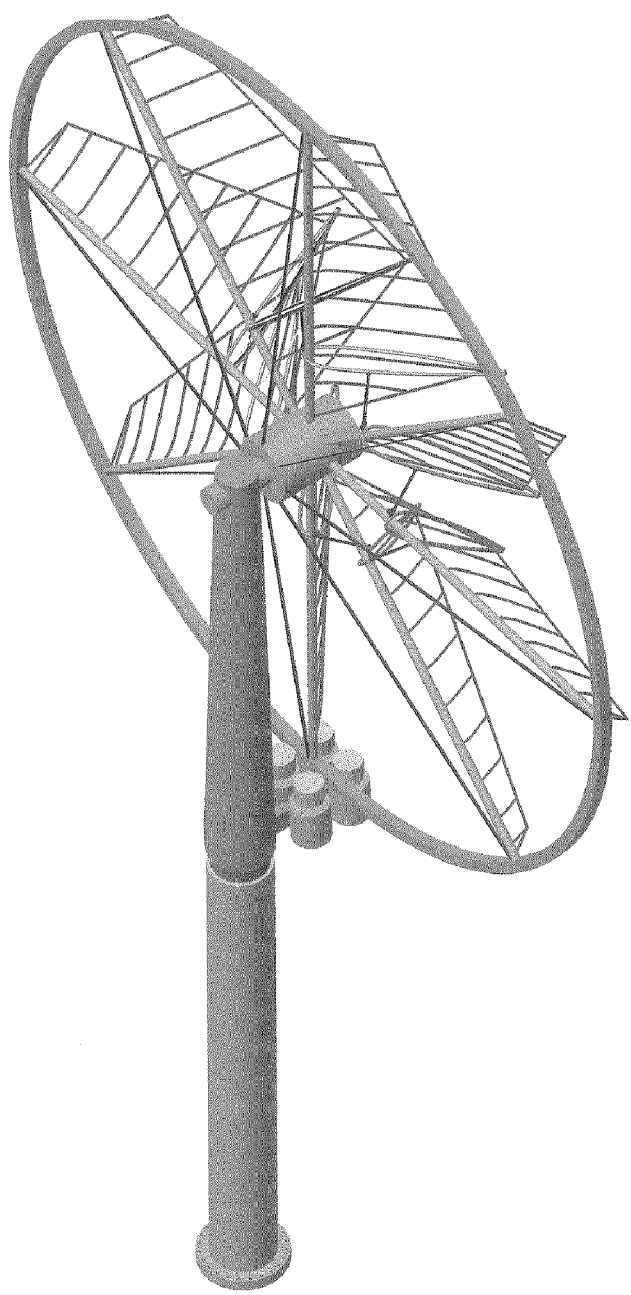
Fig.(1)

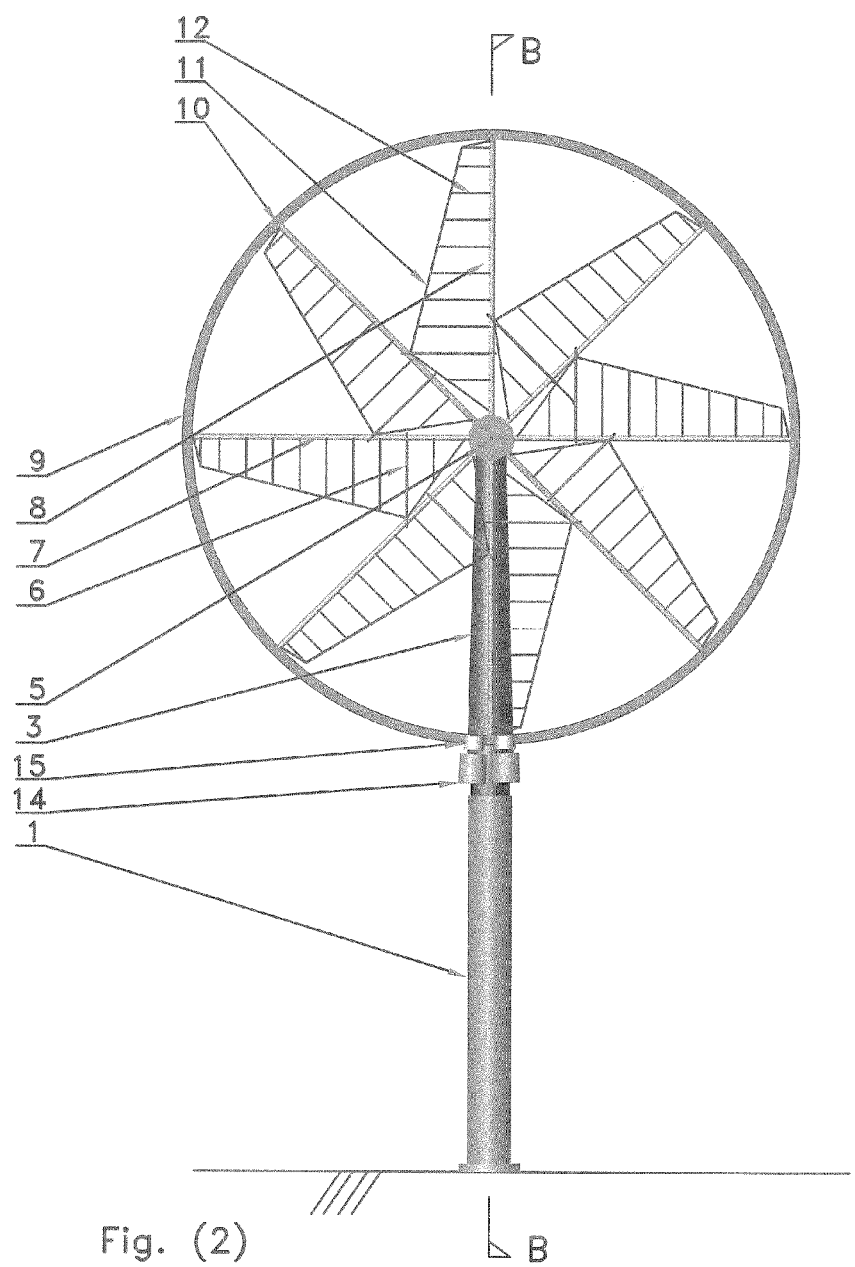
Fig. (2)

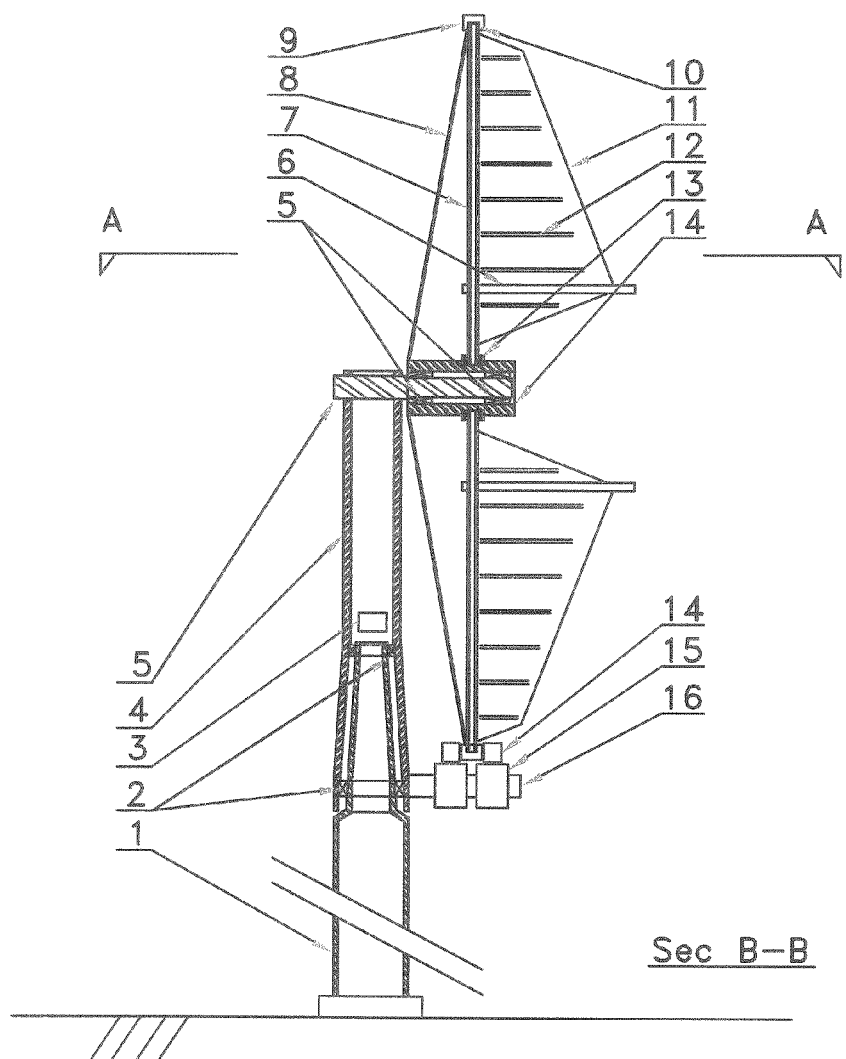
Fig. (3)

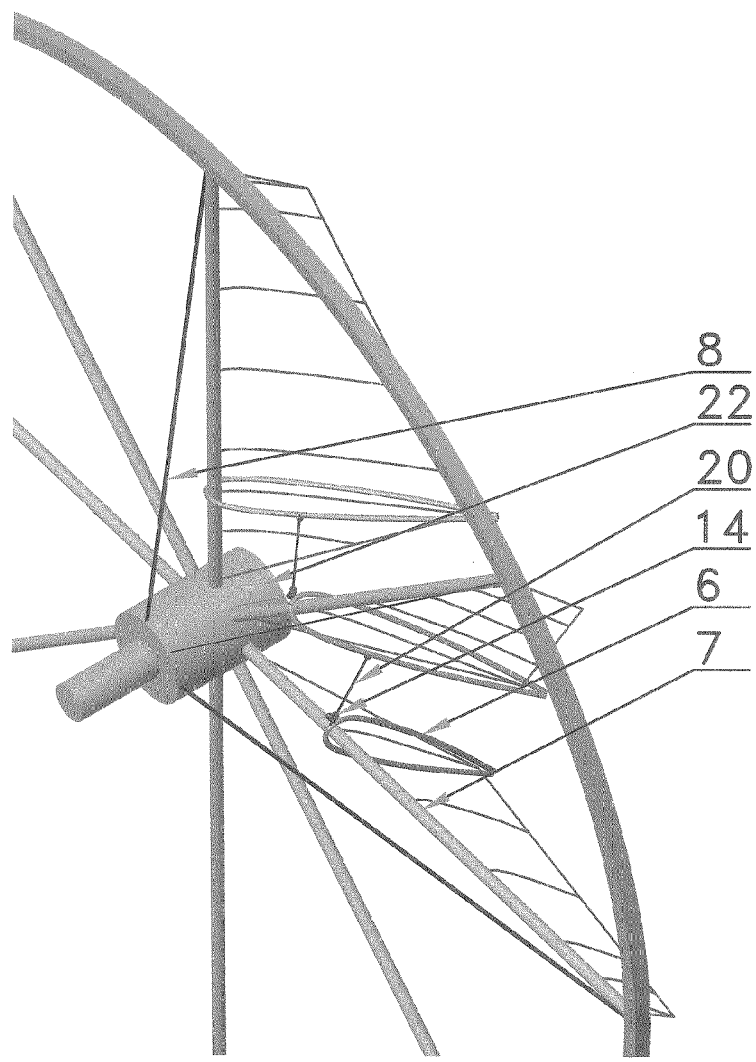
Fig. (4)

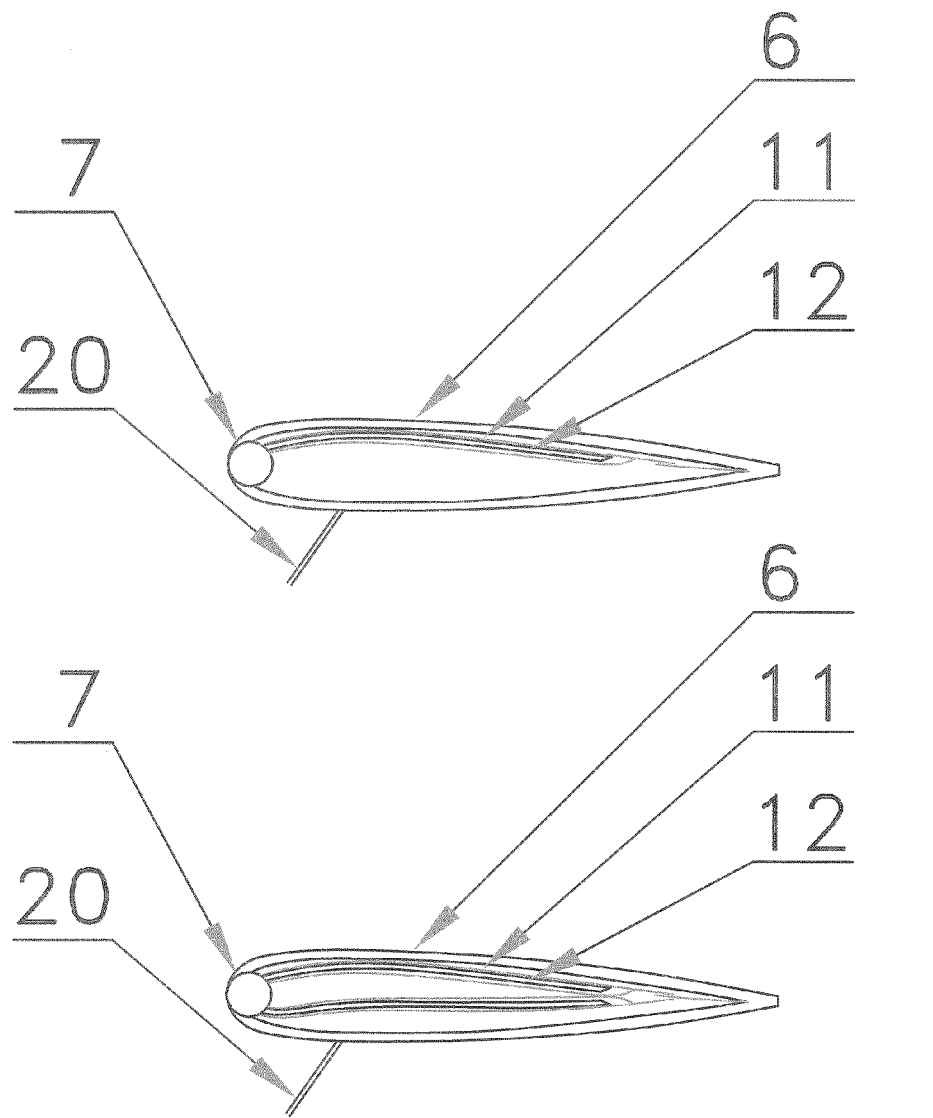
Fig. (5)
Sec A-A

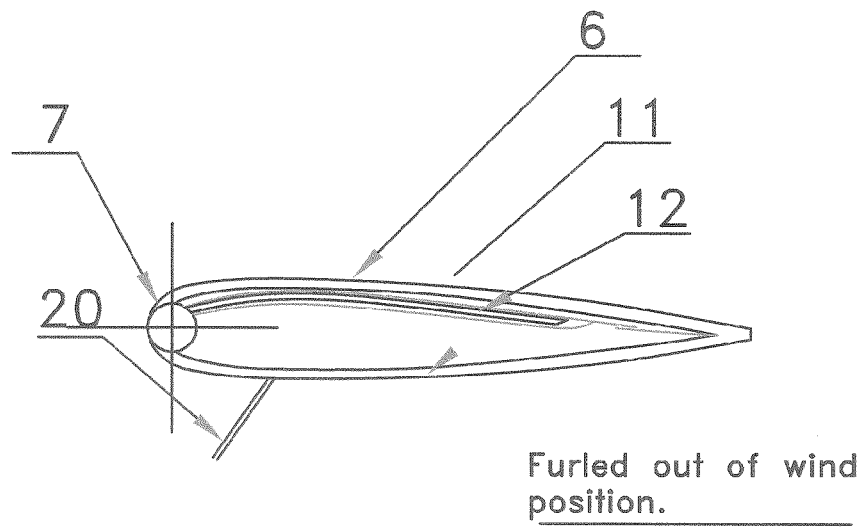
Furled out of wind position.
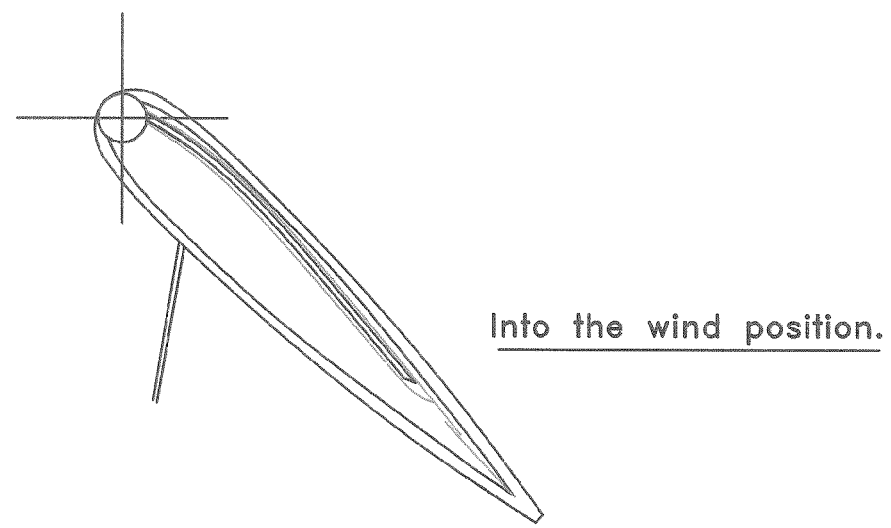
Into the wind position.
Fig. (6)   Sec A-A

WIND POWER DEVICE

CROSS-REFERENCE TO RELATED APPLICATIONS

Not applicable.

BACKGROUND OF THE INVENTION (1) Field of the Invention

The present invention relates to wind power generating devices, specifically to wind wheel style turbines.

(2) Description of Related Art Including Information Disclosed Under 37 CFR 1.97 and 1.98

With the current climate change crisis and rising energy demand, the world is looking at wind power to supply a greater share of that energy demand. While wind energy is widely available, it is a dilute form of energy, and wind turbine blades have to be large to generate a sufficient amount of energy from that medium.

Most wind turbines are either of the horizontal or vertical shaft type. Prior vertical shaft turbine designs have proven uneconomic and achieved only limited success. Of the horizontal shaft turbine designs, most either have the blades in a self-supporting cantilever style, or have blades that are supported at their edges by a rim (a wind wheel design). The former is the most common wind turbine technology; it is the horizontal axis upwind 3-bladed design pioneered by Danish companies and used all over the world. As for the latter (wind wheel), while a few patents have been granted on that design, it has never been utilized on a commercial scale.

The disadvantages of the cantilevered blade design are as follows. It has a high center of gravity, as most of the massive components—the heavy steel hub, nacelle, yaw drive, and slew ring—are located on top of the tower. This requires the tower to be highly rigid to resist the swinging action driven by the massive inertia resulting from a heavy mass on top of the tower. Furthermore, since the blades are cantilevered, they need to be strong enough, and fatigue-resistant enough, to resist the high wind loads on a blade that can be as long as 60 m or even more. Also, because the generator has to rotate at 1500-1800 rpm, and there are economic and practical limits for the gearbox ratio used, there is a certain minimum rotational speed for the rotor blades. Usually, that speed is about 18 rpm for an 80 m diameter turbine, resulting in a fairly high tip speed (around 70 m/s) and high frictional losses to the air. Additionally, the resultant angle of attack between the blade and the wind is very shallow at this tip velocity, which reduces the generated rotational force component. Finally, because these are upwind rotors, they require an extremely strong and precise yaw ring and ring drive—these are usually two or four opposite yaw drive gears that rotate the giant nacelle/rotor, countering tremendous gyroscopic forces. Once the turbine is properly directed facing the wind, the opposing yaw drives lock against each other to take up any backlash in the slew ring gears. Due to these factors and complications, the yaw drive and slew ring system cost is a considerable portion of the total cost of a large wind turbine generator. Similarly, the high bending moment of the cantilevered blades requires a precise and expensive yaw system for each individual blade.

As for the wind wheel design, several patents exist, but none of those designs have proven to be commercially successful. U.S. App. No. 2007/016,6159 to Williams had no means of orienting the turbine to face the wind, and is a low height design confined to the ground, which reduces the amount of wind energy it can catch. U.S. App. No. 2006/027,5121 to Merswolke uses a complicated upwind design, and requires two separate yaw systems—one for the rotor and one for the power takeoff carriage mechanism, which is ground supported, which also limits the height of the design and therefore the amount of wind energy it can catch. U.S. Pat. No. 6,064,123 to Gislason uses a cumbersome ground tracked yawing mechanism, which also confines the operation of the turbine to near the ground. U.S. Pat. No. 4,729,716 to Schmidt uses an upwind configuration and has the same handicaps as Gislason; it also uses a single sail method, which, although cheaper than blades, is seriously aerodynamically inefficient, and uses a complicated blade pitch mechanism. The Schmidt design is also limited to a low height. U.S. Pat. No. 4,350,895 to Cook, like Schmidt, uses aerodynamically inefficient sails, and also has a complicated positive yaw carriage to lift the whole wind wheel and the power takeoff wheels, which also limits the height of the wind wheel. Finally, U.S. Pat. No. 4,319,865 to Richard uses a ground supported carriage to early the power takeoff wheels, which also limits its height. In other words, all of the prior art wind wheels have two limitations—they are limited in their height, which limits the amount of power they can generate, and they have upwind yaw systems, which are cumbersome, heavy, and expensive.

BRIEF SUMMARY OF THE INVENTION

The present invention overcomes the limitations of existing wind wheel designs by being a downwind configuration, which requires no yaw system at all, and which enables the wind wheel to be installed high above a tower, capturing more of the wind's kinetic energy at any specific location.

The present invention comprises a slowly rotating wind wheel, mounted on a shaft that is supported on a high tower. The wind wheel comprises semi flexible sails supported on their ends by a rim. The sails catch the wind and provide rotational force. The shaft supporting the rim is affixed to the top of a two-piece tower that has bearings to allow the upper half to rotate freely facing the wind directions. Generators are affixed to the upper half of the tower and kinetically linked to the rim of the wind wheel by rubber wheels pressed against the rim, thus allowing them to receive the kinetic energy from the rim and generate electricity from that kinetic energy.

BRIEF DESCRIPTION OF THE SEVERAL VIEWS OF THE DRAWINGS

FIG. 1 shows an isometric view of the wind turbine of the present invention.

FIG. 2 shows a front view of the wind turbine of the present invention.

FIG. 3 shows a cross-sectional view of the tower (1,5), hub (14), and wind wheel showing the inside bearings of the tower (2), the inside bearings of the hub (5), the generators (15), supports connecting them to the upper tower (6), and the tension element (8) supporting the rim (9).

FIG. 4 shows a close up view of the wing angle changing mechanism, with only two wings shown for clarity, showing the tension element (20) that rotates the wing and changes its angle of attack, its connection to the beam (6) and the wheel spokes (7).

FIG. 5 shows a cross-sectional view of two alternative embodiments of a single sail. In the embodiment shown on top, the beam (6) stretches the flexible sail (11), which has an embedded rigid element (12) which approximates the desired airfoil wing shape. The embodiment shown on the bottom has a double wing shape, with the same design but double sheet sails, each of which have embedded rigid elements (12).

FIG. 6 shows a change in the wing's angle of attack.

DETAILED DESCRIPTION OF THE PREFERRED EMBODIMENT

The preferred embodiment of the present invention comprises a very large diameter rim 9 connected to a hub 14. The hub 14 and the rim 9 are connected by a plurality of spokes 7. These spokes may be supported by tensile elements 8 at an angle to the spokes on the upwind side of the spokes. The tensile elements thus bear all the large horizontal force generated by the wind, and thus reduce the bending at the spoke root to a minimum. The spokes are connected to the wings 11 in such a way that when the spokes rotate along their longitudinal axis, the wing's angle of attack changes accordingly. The connections between the spokes and the rim or the hub can be very simple bushings or a flexible material that allows a certain measure of twist, similar to the root support of a windsurf sail. A slew ring on the wing root is not required.

The wings 11 can be manufactured of aluminum or wood, or like early airplanes, comprise airfoil ribs covered with canvas or any other flexible tension-bearing sheet material. The airfoil ribs 12 define the shape of the wing, thus dictating the amount of lift (and drag) generated. No composite material is necessarily required, and the wing sections can be fairly thin since the wing is supported at both ends and rotates slowly, thus improving its lift to drag ratio.

In an alternative embodiment, the wings 11 can be single or double sheet sails. Inside the sails, airfoil shaped rods 12 can be embedded, thus supporting the flexible material and giving it a shape closely approximating an airfoil shape. This is a cheaper and lighter alternative to a rigid wing, albeit a less efficient one.

The angle of attack (AOA) changing mechanism comprises a solid element across the chord of the wing called the beam 6. The beam is rigidly connected to the spoke carrying the wing and connected to the wing at one or several points along its length. In the case of flexible sails, the beam is also used to stretch the sails. The beam can have any cross-sectional shape that resists bending. The beam is rotated by pulling it with a tensile element 20. Each of the wings' beams is connected by a tensile element that rolls/hinges on a roller 21 affixed to the next spoke 7. The tensile elements run through the spokes to a central point in the hub; all the tensile elements are pulled together with a control mechanism 22, which can be a spring loaded mechanism, a fluid actuated pressurized cylinder, or an electrical actuator mechanism. The amount of pull on the tensile elements regulates the angle of attack of the wings, making it possible to furl the wings in excessive wind speeds, or to adjust the angle of attack to the optimum value that gives the best lift for the given wind speed.

The power take off wheels 14 are small diameter friction wheels or gears pressing on opposite sides in contact with the rim 9. When the rim rotates, it causes the wheels to rotate. These wheels are much smaller in diameter than the rim; so even when the rim rotates very slowly, the wheels rotate at a much greater rpm than the rim—close to the required speed of the electrical generator, which is around 1500 rpm—thus, requiring a very small reduction gearbox if any is needed at all. The wheels are directly connected to energy converters 15, such as electrical generators, pumps, or frictional heat generators, which convert the rotational energy of the wheels into useful work in the form of electricity, heat, or fluid pressure. The energy converters 15 are supported by support beam 16.

The tower comprises two concentric columns—lower column 1 and upper column 4. The lower column and upper column are connected with two anti friction bearings 2, one located at the upper tip of the lower inner column and the other located inside the lower tip of the upper column 4. The stationary shaft 5 is fixed to the upper tower 4 such that the outer rim's lowest part does not go lower than the lower tip of the upper tower, or such that the power takeoff wheels are supported by the lower part of the upper tower, and they rotate with it, maintaining contact with the outer rim.

Because the upper tower 4 rotates freely around its axis, a power transfer slip ring 3 is utilized to avoid overtwisting and damaging the power and control cables. Slip ring devices with the required current and voltage capacities are commercially available and well known in the art. If the wind wheel is used to drive gas compressors or hydraulic pumps, a hydraulic distributor similar to the ones used inside the slew rings of rotating hydraulic excavators or other hydraulic construction equipment will be used to avoid twisting and damaging the hydraulic high pressure hoses if the upper tower makes a few full revolutions.

In an alternate embodiment, a chain or brake mechanism can be used to limit the number of full revolutions the upper tower completes around its longitudinal axis, and an alarm can sound if the safe limit of the cables/hoses is reached, prompting manual untwisting action to be initiated. This is a way to save the cost of the slip rings, especially if the wind wheel is operating in an area where the wind rarely changes direction in such a way as to cause the upper tower to rotate several full revolutions.

The invention claimed is:

1. A wind turbine comprising:
   a support tower;
   a shaft affixed to the support tower;
   a wind wheel mounted on the shaft in a manner that allows the wind wheel to rotate around its axis, said wind wheel comprising:
      a plurality of longitudinal spokes mounted on the rotor, each spoke having a tip;
      a semi-flexible wing attached to each spoke in a way that enables the angle of attack between the wing and the direction of the wind to be changed;
      a ring attached to the tip of each spoke;
   a fairing on the upwind side of the wind wheel that keeps the wind wheel on the downwind side of the support tower regardless of wind direction;
   one or more energy generators mechanically coupled to the ring;
   a controller that controls the angle of attack of the wings, the rotational resistance of the generators, and the energy produced by the generators in response to the wind speed.

2. The wind turbine of claim 1, where the support tower comprises:
   a lower column;
   an upper column mounted on the lower column in a way that enables the upper column to rotate around its axis;
   the upper column supporting the energy generators.

3. The wind turbine of claim 2, wherein the upper column further comprises a chain mechanism that limits over-twisting.

4. The wind turbine of claim 1, wherein the wings are constructed of a solid bending-resistant material.

5. The wind turbine of claim 1, wherein the wings are made of a flexible material supported by airfoil ribs.

6. The wind turbine of claim 1, further comprising:
a bending resistant sail beam extending across the chord of each wing, the sail beam connected to the spoke of the wing and to the wing itself at one or more points along its cross section;
one or more tension elements attached to the sail beam and used to change the attack angle of the wing by applying a pulling force to the sail beam.

7. The wind turbine of claim 5, wherein each wing is made of a plurality of separate sheets of flexible material.

8. The wind turbine of claim 1, wherein the energy generators generate electricity.

9. The wind turbine of claim 7, further comprising:
a bending resistant sail beam extending across the chord of each wing, the sail beam comprising two or more bending resistant elements, one for each sheet of flexible material in the wing.

10. The wind turbine of claim 1, where the controller keeps the rotation of the wind turbine within a desired range of speed by energizing or de-energizing one or more of the energy generators.

* * * * *